United States Patent
Akiyama

(10) Patent No.: US 7,159,985 B2
(45) Date of Patent: Jan. 9, 2007

(54) PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/252,539

(22) Filed: Oct. 19, 2005

(65) Prior Publication Data

US 2006/0092390 A1    May 4, 2006

(30) Foreign Application Priority Data

Nov. 1, 2004    (JP)    ............... 2004-317565

(51) Int. Cl.
- G03B 21/14   (2006.01)
- G03B 21/20   (2006.01)
- G03B 21/28   (2006.01)
- G02F 1/1335  (2006.01)
- H04N 5/64    (2006.01)

(52) U.S. Cl. .................. 353/20; 353/31; 353/33; 353/99; 353/102; 353/122; 348/744; 349/9

(58) Field of Classification Search .............. 353/20, 353/31, 33, 97, 99, 102, 122; 349/9; 348/742, 348/743, 744; 463/20
See application file for complete search history.

(56) References Cited

U.S. PATENT DOCUMENTS

2004/0192430 A1*  9/2004  Burak et al. ................. 463/20

FOREIGN PATENT DOCUMENTS

JP    A 2002-148712    5/2002

OTHER PUBLICATIONS

Taiichiro Kurita, Picture Quality of Hold Type Display for Moving Images, NHK Science and Technical Research Laboratories, 1-10-11, Kinuta, Setagaya-ku, Tokyo 157-5810, pp. 55-60. (With English Translations).

* cited by examiner

Primary Examiner—Melissa Jan Koval
(74) Attorney, Agent, or Firm—Oliff & Berridge, PLC

(57) ABSTRACT

A projector includes: an illumination device including a light source that emits a parallel illuminating light beam, lens integrators each having a first lens array to split the illuminating light beam into a plurality of secondary light beams, a second lens array, and a superimposing lens that superimposes the secondary light beams; an electro-optic modulating device that modulates the illuminating light beam; a projection optical system that projects the modulated illuminating light beam; a mode-selecting device that selects a normal mode in which an image-forming region is illuminated in lengthwise or crosswise directions, and a persistence-of-vision-relaxed mode in which the image-forming region is illuminated in lengthwise or crosswise directions and partially illuminated in the other direction; and a scanning system to scan the image-forming region of the electro-optic modulating device along the other direction in synchronization with a frame rate of the electro-optic modulating device when in a persistence-of-vision-relaxed mode.

12 Claims, 10 Drawing Sheets

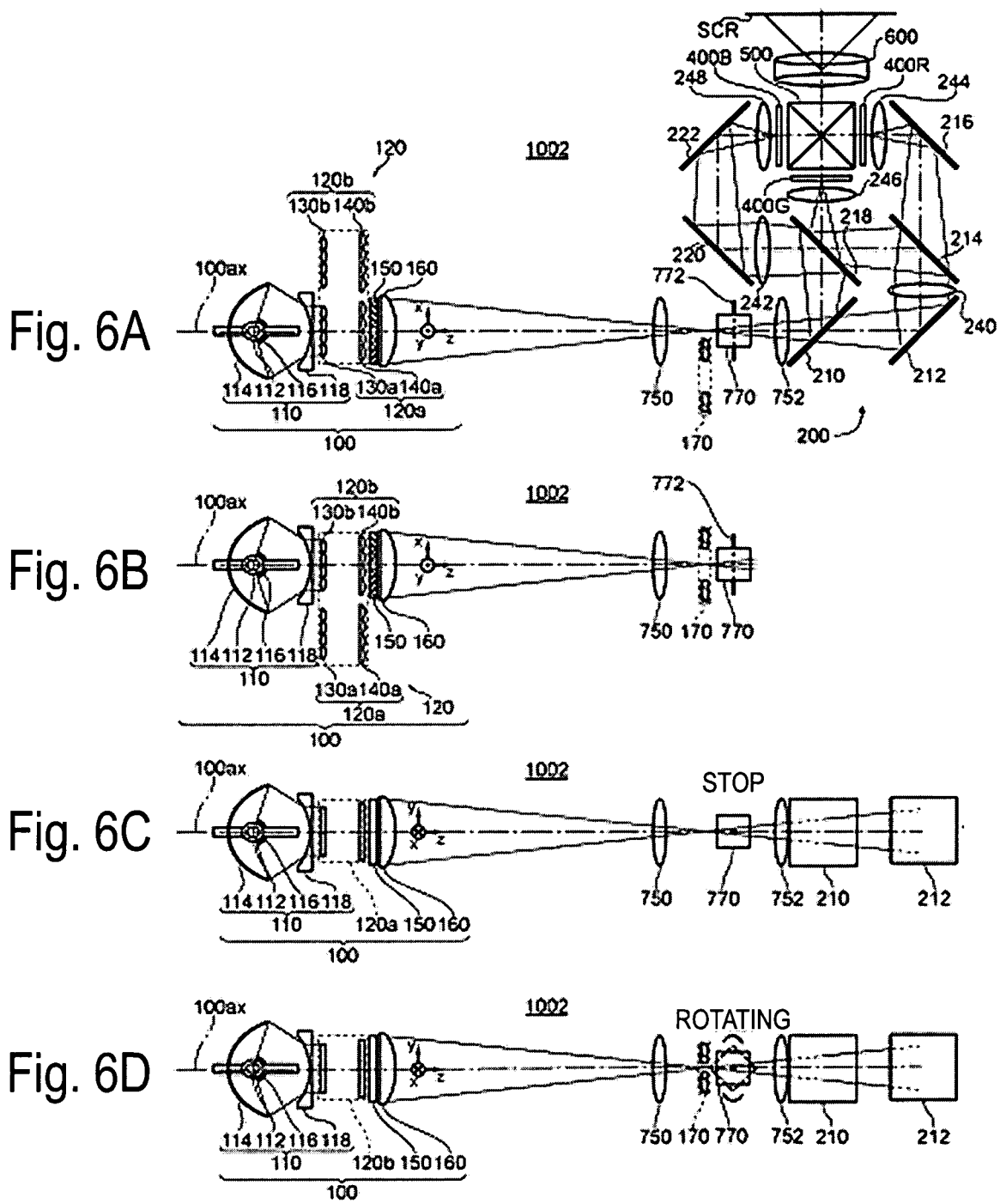

PROJECTOR

INCORPORATION BY REFERENCE

This application claims the benefit of Japanese Patent Application No. 2004-317565, filed Nov. 1, 2004. The entire disclosure of the prior application is hereby incorporated by reference herein in its entirety.

BACKGROUND

The exemplary embodiments relate to a projector.

A related art projector is shown in FIGS. 10A–10C. FIG. 10A is a view showing an optical system of the related art projector. FIGS. 10B and 10C are views of assistance in explaining a problem with similar related art projectors.

A projector 900A has liquid crystal devices 400R, 400G, 400B used as electro-optic modulators that are a hold type display device having a brightness characteristic as shown in FIG. 10B. Therefore, unlike a CRT, which is an impulse type display device having a brightness characteristic as shown in FIG. 10C, the projector 900A has a problem in that smooth moving-picture display can not be achieved because of a persistence of vision. The persistence of vision is described in, for example: "Image Quality of Moving-picture Display on Hold Type Display," EID99–10, pp. 55–60, The Institute of Electronics, Information and Communication Engineers Technical Report (June 1999).

Another related art projector is shown in FIGS. 11A–11C. FIG. 11A is a view showing an optical system of the related art projector. FIGS. 11B and 11C are views of assistance in showing an optical shutter used for the related art projector.

The problem described above is solved in the projector 900B as follows. As shown in FIG. 11A, optical shutters 420R, 420G, 420B are disposed on light-incident sides of the liquid crystal devices 400R, 400G, 400B respectively so as to cut off light intermittently. In other words, the shutters are arranged so that the persistence of vision is relaxed, whereby smooth and good-quality moving-picture display can be attained (see e.g. JP-A-2002-148712, esp. FIGS. 1–7).

However, the latter related art projector still has a problem in that the use of light efficiency is reduced significantly because the optical shutters cut off light intermittently.

SUMMARY

An advantage of the exemplary embodiments is to provide a projector, whose use of light efficiency is not reduced significantly even when the projector is arranged so as to attain a smooth and good-quality moving-picture display.

A projector according to an exemplary embodiment includes: an illumination device including a light source having sides, one of the sides being nearer to an illuminated region than another of the sides, the light source emitting a substantially parallel illuminating light beam on the one side that is nearer to the illuminated region, lens integrators, each of the lens integrators having a first lens array with a plurality of first small lenses to split the illuminating light beam emitted from the light source into a plurality of secondary light beams, and a second lens array with a plurality of second small lenses corresponding to the plurality of first small lenses of the first lens array, and a superimposing lens that superimposes the secondary light beams output from the lens integrator in the illuminated region; an electro-optic modulating device that modulates the illuminating light beam emitted from the illumination device according to image information; a projection optical system that projects the illuminating light beam modulated by the electro-optic modulating device; a mode-selecting device that selects a mode of the projector, including a normal mode in which an image-forming region of the electro-optic modulating device is entirely illuminated in any of lengthwise and crosswise directions of the image-forming region, and a persistence-of-vision-relaxed mode in which the image-forming region of the electro-optic modulating device is entirely illuminated in one of the lengthwise and crosswise directions of the image-forming region and partially illuminated in the other direction; and a scanning system that makes the illuminating light beam scan the image-forming region of the electro-optic modulating device along the other direction in synchronization with a frame rate of the electro-optic modulating device when the mode-selecting device selects the persistence-of-vision-relaxed mode; the illumination device having, as the lens integrators, a normal mode lens integrator that is inserted in an optical path of the illuminating light beam when the mode-selecting device selects the normal mode, and a persistence-of-vision-relaxed mode lens integrator that is inserted in the optical path of the illuminating light beam when the mode-selecting device selects the persistence-of-vision-relaxed mode; the first small lenses in the first lens array in the normal mode lens integrator having a two-dimensional shape similar to the image-forming region of the electro-optic modulating device so as to shape the illuminating light beam emitted from the illumination device into an illuminating light beam having a sectional shape that entirely illuminates the image-forming region of the electro-optic modulating device in any of the lengthwise and crosswise directions of the image-forming region; and the first small lenses in the first lens array in the persistence-of-vision-relaxed mode lens integrator having a two-dimensional shape shortened in the other direction so as to shape the illuminating light beam emitted from the illumination device into an illuminating light beam having a sectional shape that entirely illuminates the image-forming region of the electro-optic modulating device in the one direction of the image-forming region and partially illuminates the image-forming region in the other direction.

Therefore, in the projector, when the mode-selecting device selects the persistence-of-vision-relaxed mode, the persistence-of-vision-relaxed mode lens integrator is inserted in the optical path of the illuminating light beam and the scanning system performs a predetermined action. As a result, according to the projector, the illuminating light beam is shaped so as to entirely illuminate the image-forming region of the electro-optic modulating device in one of lengthwise and crosswise directions of the image-forming region and partially illuminate the image-forming region in the other direction, and has a sectional shape shortened in the other direction; the illuminating light beam can be made to scan the image-forming region along the other direction in synchronization with the frame rate of the electro-optic modulating device. Thus, in the image-forming region of the electro-optic modulating device, light-illuminated and light-unilluminated areas are scrolled alternately in turn. As a result, a projector in which the persistence of vision is relaxed and by which smooth and good-quality moving-picture display can be achieved is made.

Further, the illuminating light beam having a sectional shape shortened in the other direction as described above is attained by using, as a lens integrator, the persistence-of-vision-relaxed mode lens integrator having the first lens array with the first small lenses shortened in the other direction in two-dimensional shape. Therefore, in contrast with the case of using an optical shutter, an illuminating light beam emitted from the light source can be guided to the image-forming region of the electro-optic modulating device without wasting it, and thus significant reduction in efficiency of use of light is avoided.

Therefore, even when the arrangement that enables smooth and good-quality moving-picture display is made, the projector can become a projector whose efficiency of use of light is not reduced significantly. In this respect, the exemplary embodiments offer an advantage.

As for the projector, the mode-selecting device may be a device that selects which of the normal and persistence-of-vision-relaxed modes the projector is made to work in, according to a user operation, or may be a device that detects the trait of a content to be displayed and automatically selects which of the normal and persistence-of-vision-relaxed modes the projector is made to work in based on the trait of the content.

In an exemplary embodiment, a length of each first small lens in the persistence-of-vision-relaxed mode lens integrator along the one direction is identical with a length of each first small lens in the normal mode lens integrator along the one direction. In another exemplary embodiment, a length of each first small lens in the persistence-of-vision-relaxed mode lens integrator along the other direction is shorter than a length of each first small lens in the normal mode lens integrator along the other direction.

In an exemplary embodiment, a number of lines of the first small lenses in the persistence-of-vision-relaxed mode lens integrator along the one direction is identical with a number of lines of the first small lenses in the normal mode lens integrator along the one direction. In another exemplary embodiment, a number of lines of the first small lenses in the persistence-of-vision-relaxed mode lens integrator along the other direction is larger than a number of lines of the first small lenses in the normal mode lens integrator along the other direction.

In an exemplary embodiment, an outer size of the first lens array in the persistence-of-vision-relaxed mode lens integrator is identical with an outer size of the first lens array in the normal mode lens integrator.

In an exemplary embodiment, a focal length of each first small lens in the persistence-of-vision-relaxed mode lens integrator is identical with a focal length of each first small lens in the normal mode lens integrator.

By arranging the projector in this way, switching between the normal and persistence-of-vision-relaxed modes can be accomplished by just replacing the normal mode lens integrator and the persistence-of-vision-relaxed mode lens integrator with each other as they are. Therefore, the mechanism to replace the normal mode lens integrator and the persistence-of-vision-relaxed mode lens integrator with each other can be made extremely simple.

In an exemplary embodiment, the first lens array in the normal mode lens integrator and the first lens array in the persistence-of-vision-relaxed mode lens integrator have first small lenses arrayed in 4 columns along the one direction.

By arranging the projector in this way, the lens density of the first small lenses of the first lens array become smaller than those in the case of a related art projector, which allows the first small lenses to have sufficient sizes. This avoids extremely shortening the side lengths of the first small lenses in the first lens array along the other direction. As a result, images by the first small lenses of the first lens array can be well accepted by the corresponding second small lenses of the second lens array, and therefore a good efficiency of use of light can be obtained.

When being inserted in the optical path of an illuminating light beam, the first lens array in the normal mode lens integrator and the first lens array in the persistence-of-vision-relaxed mode lens integrator each have a light-incident surface located nearer to the ellipsoidal reflector in comparison to the second focal point of the ellipsoidal reflector. Further, the first lens array are disposed in place so that the light amount of the illuminating light beam on the light-incident surface, which has been emitted from the light source, is distributed over the entire light-incident surface.

By arranging the projector in this way, the light amount of an illuminating light beam emitted from the light source is distributed over the entire light-incident surface of the first lens array. Therefore, even when the lens density of the first lens arrays is made relatively smaller by arraying the first small lenses in 4 columns along the one direction, the in-plane light intensity distribution characteristics on their image-forming regions of the electro-optic modulating device are kept from being deteriorated, and therefore the manufacturing work for the first lens arrays can be simplified and the cost therefor can be reduced.

Also, in this case, when the first lens array in the normal mode lens integrator and the first lens array in the persistence-of-vision-relaxed mode lens integrator are individually inserted in the optical path of an illuminating light beam, the first lens arrays are each disposed in place so that an area with an extremely small incident light intensity (i.e. a so-called shadow area of the arc tube) does not exist in a central portion of the light-incident surface of each the first lens array. By arranging the projector in this way, the light amount of an illuminating light beam on the light-incident surface of each first lens array, which has been emitted from the light source, is distributed over the entire light-incident surface.

For the electro-optic modulating device of the projector, electro-optic modulators having an image-forming region with "a rectangle with a ratio of its lengthwise size to the crosswise size=3:4" and "a rectangle with a ratio of its lengthwise size to the crosswise size=9:16," as its two-dimensional shape, are widely used. On this account, what can be used as each first small lens of the first lens array in the normal mode lens integrator may be a lens having as its two-dimensional shape "a rectangle with a ratio of its lengthwise size to the crosswise size=3:4, 9:16." Further, what can be used as each first small lens of the first lens array in the persistence-of-vision-relaxed mode lens integrator may be a lens having as its two-dimensional shape "a rectangle with a ratio of its lengthwise size to the crosswise size=3:8, 9:32, 1:4."

In an exemplary embodiment, the scanning system is stopped in place so that the illuminating light beam illuminates the entire image-forming region of the electro-optic modulating device when the mode-selecting device selects the normal mode.

By arranging the projector in this way, when the mode-selecting device selects the normal mode, the efficiency of use of light can be made higher and the level of stray light can be made lower.

In an exemplary embodiment, the light source has an arc tube; an ellipsoidal reflector that reflects light from the arc tube; an auxiliary mirror that reflects light emitted by the arc tube on a side nearer to the illuminated region toward the arc tube; and a collimator lens that makes light reflected by the ellipsoidal reflector a substantially parallel light.

Arranging the projector in this way can make smaller the angular range of an illuminating light beam incident on the first small lenses of each first lens array and as such, secondary light beams output from the first small lenses are well accepted by the second small lenses of the corresponding second lens array. Thus the efficiency of use of light is increased. In this case, the second small lenses are smaller when the mode-selecting device selects the persistence-of-vision-relaxed mode and as such, the effect becomes especially larger.

In addition, the auxiliary mirror reflects light radiated by the arc tube on the side nearer to the illuminated region toward the ellipsoidal reflector and as such, it becomes unnecessary to set the size of the ellipsoidal reflector so as to entirely cover the side of the arc tube nearer to the illuminated region extending to the edge of the arc tube. Hence, there is an advantage in that the ellipsoidal reflector can be downsized, whereby the illumination device can consequently be made smaller.

Moreover, since the convergent angle of a beam that converges from the ellipsoidal reflector toward the second focal point of the ellipsoidal reflector and the beam spot diameter thereof can be reduced by providing the auxiliary mirror, there is another advantage in that the optical components in the stages behind it can be made smaller, which enables further downsizing of the illumination device.

In an exemplary embodiment, the scanning system includes a rotating prism disposed between the illumination device and electro-optic modulating device, the rotating prism having a rotation axis perpendicular to an illuminating-optical axis, the rotation axis being disposed in a substantially optically conjugate place with respect to the electro-optic modulating device between the illumination device and electro-optic modulating device. In another exemplary embodiment, the rotating prism is arranged so that its rotation causes light-illuminated and light-unilluminated areas to be scrolled in turn on the electro-optic modulating device in synchronization with the frame rate of the electro-optic modulating device.

By arranging the projector in this way, smooth scrolling movement of the light-illuminated and light-unilluminated areas can be realized in the image-forming region of the electro-optic modulating device when the mode-selecting device selects the persistence-of-vision-relaxed mode.

In an exemplary embodiment, a light-shielding device is included that is inserted in a substantially optically conjugate place with respect to the electro-optic modulating device between the illumination device and scanning system when the mode-selecting device selects the persistence-of-vision-relaxed mode.

In an exemplary embodiment, the scanning system includes a rotating prism having a rotation axis perpendicular to an illuminating-optical axis. In another exemplary embodiment, the rotating prism is arranged so that its rotation causes light-illuminated and light-unilluminated areas to be scrolled in turn on the electro-optic modulating device in synchronization with the frame rate of the electro-optic modulating device.

Also, arranging the projector in this way can realize smooth scrolling movement of the light-illuminated and light-unilluminated areas in the image-forming region of the electro-optic modulating device when the mode-selecting device selects the persistence-of-vision-relaxed mode. In this case, the following advantage can be further obtained.

That is, in the case where an arc tube with a relatively longer arc length (1.3 mm or longer) is used, an illuminating light beam emitted from the illumination device does not make an ideal illuminating light beam that has a two-dimensional shape shortened in the other direction in the optically conjugate place with respect to the electro-optic modulating device, but an illuminating light beam by which a portion surrounding the plane covered by the two-dimensional shape is also slightly irradiated with light in fact.

Therefore, even if the projector works in the persistence-of-vision-relaxed mode, using an illuminating light beam like this weakens the effect of relaxing the tailing, which makes impossible to obtain a clear image.

In contrast, by arranging the projector as described above, it becomes possible to block the light that has leaked out to the surrounding portion. Thus, even when an arc tube with a relatively longer arc length (1.3 mm or longer) is used, the effect of relaxing the persistence of vision is not weakened.

In an exemplary embodiment, the projector further includes: a color separation-and-light guide system between the illumination device and electro-optic modulating device, the color separation-and-light guide system separating the illuminating light beam emitted from the illumination device into a plurality of color lights; a plurality of electro-optic modulators that constitute the electro-optic modulating device and each modulate corresponding one of the color lights output from the color separation-and-light guide system according to image information corresponding to the one color light; and a cross dichroic prism that combines the color lights modulated by the plurality of electro-optic modulators.

By arranging the projector in this way, it becomes possible to make the projector, whose efficiency of use of light is not reduced significantly, a full color projector superior in image quality (e.g. 3-panel LCD type full color projector) even when the projector is arranged so as to attain smooth and good-quality moving-picture display.

In an exemplary embodiment, a polarizer element is included that aligns the illuminating light beam from the light source into linearly polarized light and outputs the resultant light.

By arranging the projector in this way, it becomes possible to convert an illuminating light beam from the light source into one kind of linearly polarized light having one polarization axis under the effect of the polarizer element. Therefore, an illuminating light beam from the light source can be used effectively in the case where an electro-optic modulator of a type such that one kind of linearly polarized light is utilized, such as a liquid crystal device, is used for the electro-optic modulating device of the projector.

BRIEF DESCRIPTION OF THE DRAWINGS

The exemplary embodiments will be described with reference to the accompanying drawings, wherein like numbers reference like elements, and wherein:

FIGS. 6A–6D are views of a projector 1002 in association with a second exemplary embodiment;

DETAILED DESCRIPTION OF EMBODIMENTS

A projector in association with the exemplary embodiments will be described below based on the drawings.

[First Exemplary Embodiment]

Figure 1A:
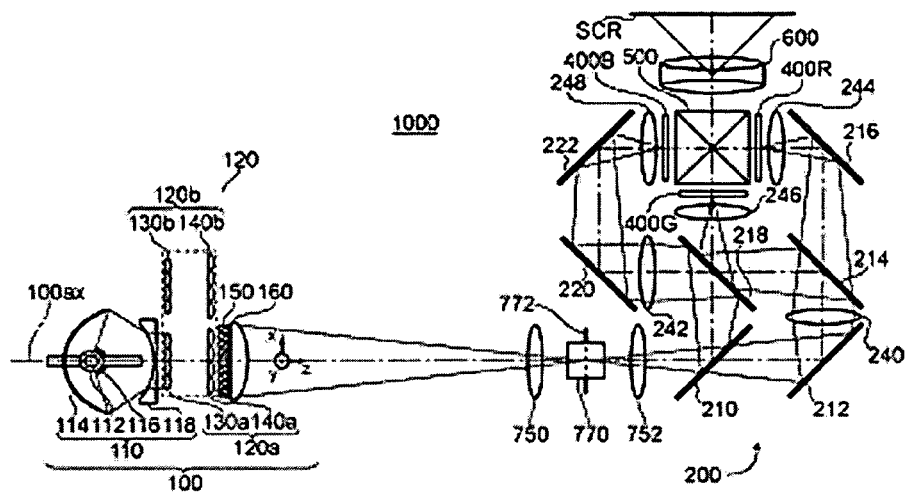
FIGS. 1A–1D are views of a projector 1000 in association with a first exemplary embodiment.
Figure 1B:
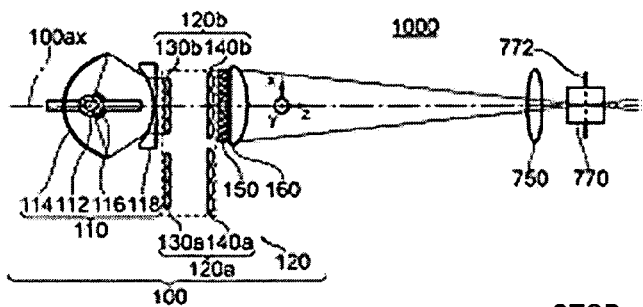
Figure 1C:
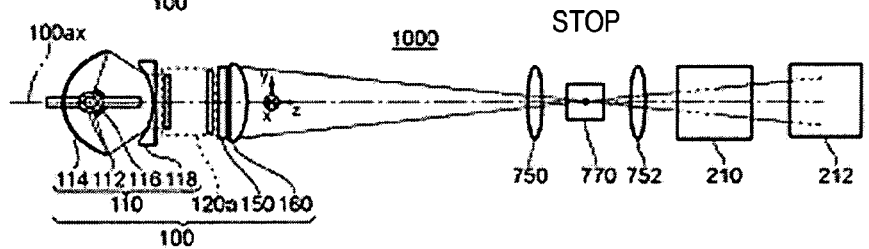
Figure 1D:
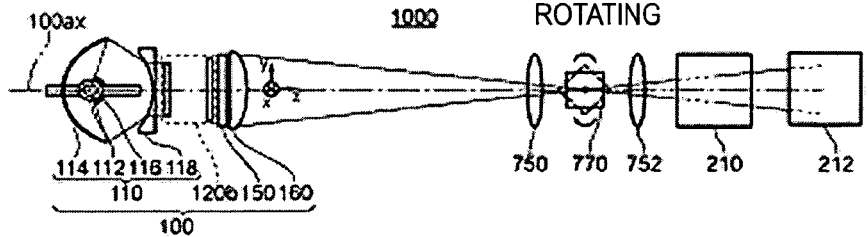

FIGS. 1A–1D illustrate a projector 1000 in association with the first exemplary embodiment. FIG. 1A is a top view of an optical system of the projector 1000 in a normal mode. FIG. 1B is a top view of the optical system of the projector 1000 in a persistence-of-vision-relaxed mode. FIG. 1C is a side view of the optical system of the projector 1000 in the normal mode. FIG. 1D is a side view of the optical system of the projector 1000 in the persistence-of-vision-relaxed mode. Now, it is noted that in FIG. 1B the parts of the optical system behind the rotating prism 770 are not shown because the parts are the same as those shown in FIG. 1A.

As described below, three directions orthogonal to one another are respectively defined as: Z-axis direction (corresponding to the direction of the illuminating-optical axis 100ax in FIG. 1A); X-axis direction (corresponding to a direction in parallel with a face of the drawing sheet of FIG. 1A and orthogonal to Z-axis); and Y-axis direction (corresponding to a direction perpendicular to the face of the drawing sheet of FIG. 1A and orthogonal to Z-axis).

As shown in FIG. 1A, the projector 1000 in association with the first exemplary embodiment is a projector including: an illumination device 100; a color separation-and-light guide system 200 that separates an illuminating light beam from the illumination device 100 into three colors of red, green and blue; three liquid crystal devices 400R, 400G, 400B used as electro-optic modulators that modulate the respective color lights resulting from the separation by the color separation-and-light guide system 200, according to image information; a cross dichroic prism 500 that combines the color lights modulated by the three liquid crystal devices 400R, 400G, 400B; a projection optical system 600 that projects the light resulting from the combining by the cross dichroic prism 500 onto a projection plane of a screen SCR or the like; and a mode-selecting device (not shown) that selects which of the normal and persistence-of-vision-relaxed modes in which the projector is made to work.

As shown in FIGS. 1A–1D, the illumination device 100 has: a light source 110 that emits a substantially parallel illuminating light beam on the side of the illuminated region; a lens integrator member 120 having first lens arrays 130a and 130b respectively including groups of first small lenses 132a and 132b (see FIGS. 2A and 2B) to split an illuminating light beam emitted from the light source 110 into secondary light beams, and second lens arrays 140a and 140b respectively including groups of second small lenses 142a and 142b (see FIGS. 2C and 2D), the second small lenses 142a, 142b corresponding to the first small lenses 132a, 132b of the first lens arrays 130a, 130b; a polarizer element 150 that aligns illuminating light beams of different polarizing directions emitted from the light source 110 into a kind of linearly polarized lights and lets out the resultant lights; and a superimposing lens 160 to superimpose the secondary light beams emitted from the polarizer element 150 in the illuminated region.

As shown in FIGS. 1A–1D, the light source 110 has: an ellipsoidal reflector 114; an arc tube 112 having its center of light emission in the vicinity of the first focal point of the ellipsoidal reflector 114; and a collimator lens 118 that converts the convergent light reflected by the ellipsoidal reflector 114 into substantially parallel light. The arc tube 112 provided with an auxiliary mirror 116 as a reflection device that reflects light emitted by the arc tube 112 on the side nearer to the illuminated region toward the arc tube 112. Light reflected by the auxiliary mirror 116 pass through the arc tube 112 and then it is reflected on the ellipsoidal reflector 114.

As shown in FIG. 1A, what is used as the color separation-and-light guide system 200 is an equi-optical path system in which length of each optical path from the illumination device 100 to the liquid crystal devices 400R, 400G, 400B are identical. The color separation-and-light guide system 200 separates an illuminating light beam emitted from the illumination device 100 into color lights and guides the color lights to the liquid crystal devices 400R, 400G, 400B.

The liquid crystal devices 400R, 400G, 400B modulate the illuminating light beams that have entered themselves according to the image information and form a color image. Therefore, the liquid crystal devices are illumination targets for the illumination device 100. While the graphical representations are omitted, incident-side polarizers are respectively interposed between the color separation-and-light guide system 200 and the liquid crystal devices 400R, 400G, 400B; light exiting-side polarizers are respectively interposed between the liquid crystal devices 400R, 400G, 400B and the cross dichroic prism 500. The light incident-side polarizers, liquid crystal devices 400R, 400G, 400B, and light exiting-side polarizers perform light modulations of individual incident color lights.

The liquid crystal devices 400R, 400G, 400B each include a pair of light-transmissive glass substrates, and liquid crystal as an electro-optic material sealed in between the substrates. For example, the liquid crystal devices use poly silicon thin film transistor as switching elements and modulate, in a polarizing direction, one kind of linearly polarized lights emitted from the light incident-side polarizers according to supplied image signals.

Wide vision liquid crystal devices are used as the liquid crystal devices 400R, 400G, 400B, the wide vision liquid crystal devices having as its two-dimensional shape, "a rectangle with a ratio of its lengthwise size along the Y-axis direction to its crosswise size along the X-axis direction=9:16."

The cross dichroic prism 500 is an optical element that combines optical images modulated for each of the color lights emitted from the light exiting-side polarizers to form a color image. The cross dichroic prism 500 is constructed of four right-angle prisms bonded together and has a substantial square shape in plane view. At the interfaces between the right-angle prisms bonded together, dielectric multilayer films are formed in a substantial X-shape. One of the dielectric multilayer films in substantial X-shape reflects a red color light, and the other reflects a blue color light. Red and blue color lights are subjected to reflection by the dielectric multilayer films and made to coincide with a green color light in a traveling direction, whereby the three color lights are combined.

A color image that is output from the cross dichroic prism 500 is enlarged and projected by the projection optical system 600 to form an oversize-screen image on the screen SCR.

The projector 1000 in association with the first exemplary embodiment includes: a mode-selecting device to select which of the normal and persistence-of-vision-relaxed modes the projector is made to work in; a lens integrator member 120 having a normal mode lens integrator 120a and a persistence-of-vision-relaxed mode lens integrator 120b; and a predetermined scanning system. A detailed description of the projector 1000 follows.

The projector 1000 in association with the first exemplary embodiment includes a mode-selecting device (not shown) to select which of the normal and persistence-of-vision-relaxed modes in which the projector is made to work.

Therefore, according to the projector 1000 in association with the first exemplary embodiment, the following are made possible: to select the normal mode in the case where less-moving or brighter screen display is required, and to select the persistence-of-vision-relaxed mode in the case where faster-moving or clearer screen display is needed. Thus, it becomes possible to display in an optimal mode depending on a content to be displayed.

The mode-selecting device may be a device that selects which of the normal and persistence-of-vision-relaxed modes the projector is made to work in according to a user operation, or may be a device that detects the trait of a content to be displayed and automatically selects which of the normal and persistence-of-vision-relaxed modes the projector is made to work in based on the trait of the content.

The projector 1000 in association with the first exemplary embodiment includes a lens integrator member 120 having a normal mode lens integrator 120a and a persistence-of-vision-relaxed mode lens integrator 120b.

In regard to the normal mode lens integrator 120a, the first small lenses 132a in the first lens array 130a each have a two-dimensional shape similar to the image-forming region of the liquid crystal device. The two-dimensional shape is intended to turn an illuminating light beam emitted from the illumination device 100 into an illuminating light beam having a sectional shape that entirely illuminates the image-forming regions of the liquid crystal devices 400R, 400G, 400B in any of lengthwise and crosswise directions of the image-forming regions.

On the other hand, as for the persistence-of-vision-relaxed mode lens integrator 120b, the first small lenses 132b in the first lens array 130b are arranged so as to shape an illuminating light beam emitted from the illumination device 100 into an illuminating light beam having a sectional shape that entirely illuminates the image-forming regions of the liquid crystal devices 400R, 400G, 400B in one of the lengthwise and crosswise directions (X-axis direction) of the image-forming regions, and partially illuminates the image-forming regions in the other direction (Y-axis direction). Therefore, the first small lenses 132b each have a two-dimensional shape shortened in the other direction (Y-axis direction).

The projector 1000 in association with the first exemplary embodiment includes a rotating prism 770 as a scanning system.

The rotating prism 770 has the function of causing an illuminating light beam to scan along the other direction (Y-axis direction) on the image-forming regions of the liquid crystal devices 400R, 400G, 400B in synchronization with the frame rate of the liquid crystal devices 400R, 400G, 400B when the persistence-of-vision-relaxed mode is selected. The rotating prism 770 is disposed between the illumination device 100 and the liquid crystal devices 400R, 400G, 400B. The rotating prism 770 has a rotation axis 772 perpendicular to the illuminating-optical axis 100ax. The rotating axis 772 is disposed in a substantially optically conjugate place with respect to the the image-forming regions of the liquid crystal devices 400R, 400G, 400B.

Therefore, according to the projector 1000 in association with the first exemplary embodiment, when the mode-selecting device selects the persistence-of-vision-relaxed mode, the persistence-of-vision-relaxed mode lens integrator 120b is inserted in the optical path of an illuminating light beam, and the rotating prism 770 as a scanning system performs a predetermined action. As a result, the illuminating light beam is shaped so as to have a sectional shape shortened in the other direction (Y-axis direction) that enables entire illumination of the image-forming regions of the liquid crystal devices 400R, 400G, 400B in the one direction (X-axis direction) and enables partial illumination of the image-forming regions in the other direction (Y-axis direction). The illuminating light beam can be made to scan the image-forming regions of the liquid crystal devices along the other direction (Y-axis direction) in synchronization with the frame rate of the liquid crystal devices 400R, 400G, 400B. Hence, in the image-forming regions of the liquid crystal devices 400R, 400G, 400B, light-illuminated and not illuminated areas are scrolled alternately in turn. Thus, a projector in which the persistence of vision is relaxed and by which smooth and good-quality moving-picture display can be achieved is made.

In addition, according to the projector 1000 in association with the first exemplary embodiment, an illuminating light beam having a sectional shape shortened in the other direction (Y-axis direction), as described above, is attained by using, as a lens integrator, the persistence-of-vision-relaxed mode lens integrator 120b. The persistence-of-vision-relaxed mode lens integrator 120b has the first lens array 130b with the first small lenses 132b shortened in the other direction (Y-axis direction) in a two-dimensional shape. Therefore, in contrast with the case of using an optical shutter, an illuminating light beam emitted from the light source 110 can be guided to the image-forming regions of the liquid crystal devices 400R, 400G, 400B without wasting it, and thus significant reduction in efficiency of use of light is avoided.

Therefore, even when the arrangement that enables smooth and good-quality moving-picture display is made, the projector 1000 in association with the first exemplary embodiment can make a projector whose efficiency of use of light is not reduced significantly.

Figure 2A:
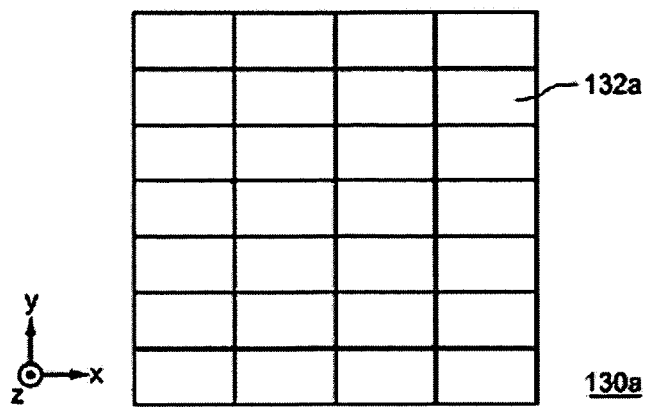
FIGS. 2A–2D are views of a normal mode lens integrator and a persistence-of-vision-relaxed mode lens integrator in the first exemplary embodiment.
Figure 2B:
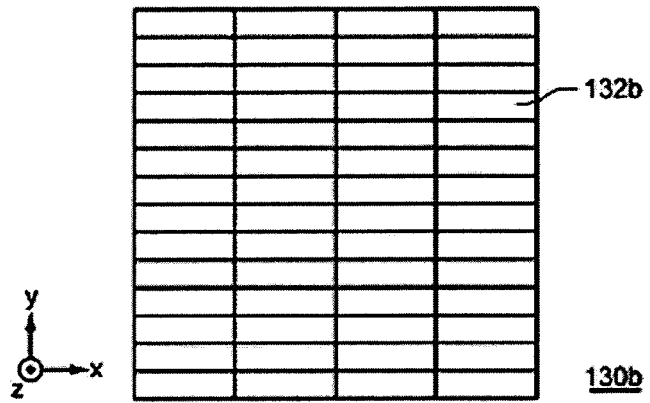
Figure 2C:
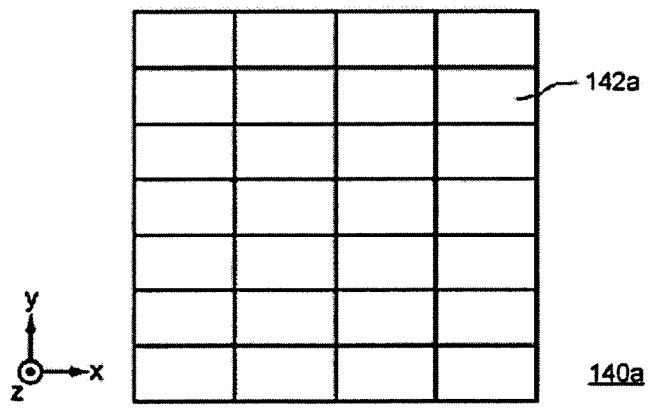
Figure 2D:
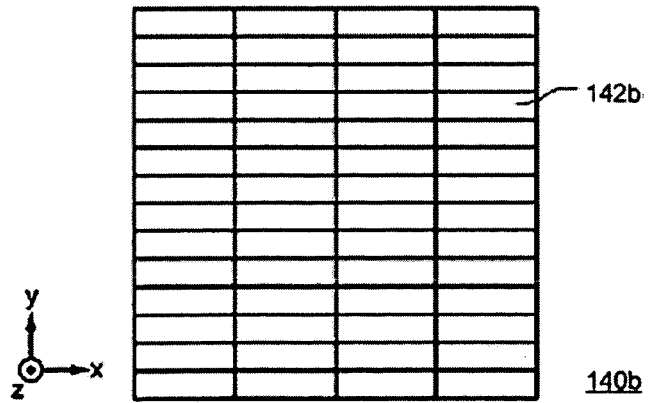

FIGS. 2A and 2B are presented to explain the normal mode lens integrator 120a and the persistence-of-vision-relaxed mode lens integrator 120b. FIG. 2A is a view showing the first lens array 130a in the normal mode lens integrator 120a. FIG. 2B is a view showing the first lens array 130b in the persistence-of-vision-relaxed mode lens integrator 120b.

The length of the first small lenses 132b in the persistence-of-vision-relaxed mode lens integrator 120b along the one direction (X-axis direction) is identical with the length of the first small lenses 132a in the normal mode lens integrator 120a along the one direction (X-axis direction). However, the length of the first small lenses 132b in the persistence-of-vision-relaxed mode lens integrator 120b along the other direction (Y-axis direction) is set to be 50% of the length of the first small lenses 132a in the normal mode lens integrator 120a along the other direction (Y-axis direction).

The number of lines (4 columns) of the first small lenses 132b in the persistence-of-vision-relaxed mode lens integrator 120b along the one direction (X-axis direction) is identical with the number of lines (4 columns) of the first small lenses 132a in the normal mode lens integrator 120a along the one direction (X-axis direction). However, the number of lines (14 rows) of the first small lenses 132b in the persistence-of-vision-relaxed mode lens integrator 120b along the other direction (Y-axis direction) is set to be double the number of lines (7 rows) of the first small lenses 132a in the normal mode lens integrator 120a along the other direction (Y-axis direction).

Therefore, the first lens array 130b in the persistence-of-vision-relaxed mode lens integrator 120b is identical in outer sizes with the first lens array 130a in the normal mode lens integrator 120a.

The focal length of the first small lenses 132b in the persistence-of-vision-relaxed mode lens integrator 120b is identical with the focal length of the first small lenses 132a in the normal mode lens integrator 120a.

Hence, according to the projector 1000 in association with the first exemplary embodiment, switching between the normal and persistence-of-vision-relaxed modes can be accomplished by just replacing the normal mode lens integrator 120a and the persistence-of-vision-relaxed mode lens integrator 120b with each other. Therefore, the mechanism to replace the normal mode lens integrator 120a and the persistence-of-vision-relaxed mode lens integrator 120b with each other can be made extremely simple.

In the projector 1000 in association with the first exemplary embodiment, the first lens array 130a in the normal mode lens integrator 120a and the first lens array 130b in the persistence-of-vision-relaxed mode lens integrator 120b have first small lenses 132a and 132b arrayed in 4 columns along the one direction (X-axis direction) respectively. Accordingly, the lens densities of the first small lenses 132a, 132b of the first lens arrays 130a, 130b become smaller than those in the case of a related art projector, which allows the first small lenses 132a, 132b to have sufficient sizes. This avoids extremely shortening the side lengths of the first small lenses 132a, 132b in the first lens arrays 130a, 130b along the other direction (Y-axis direction). As a result, images by the first small lenses 132a, 132b of the first lens arrays 130a, 130b can be well accepted by the corresponding second small lenses 142a, 142b (not shown) of the second lens arrays 140a, 140b, and therefore a good efficiency of use of light can be obtained.

In the projector 1000 in association with the first exemplary embodiment, when being inserted in the optical path of an illuminating light beam, the first lens array 130a in the normal mode lens integrator 120a and the first lens array 130b in the persistence-of-vision-relaxed mode lens integrator 120b each have a light-incident face located nearer to the ellipsoidal reflector 114 in comparison to the second focal point of the ellipsoidal reflector 114, and are disposed in place so that the light amount of the illuminating light beam on the light-incident surface, which has been emitted from the light source 110, is distributed over the entire light-incident face.

Thus, the light amount of an illuminating light beam emitted from the light source 110 is distributed over the entire light-incident surface of each of the first lens arrays 130a, 130b. Therefore, even when the lens density of the first lens arrays 130a, 130b is made relatively smaller by arraying the first small lenses 132a, 132b in 4 columns along the one direction, the in-plane light intensity distribution characteristics on the image-forming regions of the liquid crystal devices 400R, 400G, 400B are kept from being deteriorated, and therefore the manufacturing work for the first lens arrays 130a, 130b can be simplified and the cost therefor can be made lower.

When the first lens array 130a in the normal mode lens integrator 120a and the first lens array 130b in the persistence-of-vision-relaxed mode lens integrator 120b are inserted in the optical path of an illuminating light beam individually, the first lens arrays 130a, 130b are each disposed in place so that an area with an extremely small incident light intensity (i.e. a shadow area of the arc tube 112) does not exist in a central portion of the light-incident face of each of the first lens arrays 130a, 130b. As a result, the light amount of an illuminating light beam on the light-incident surface of each of the first lens arrays 130a, 130b, which has been emitted from the light source 110, is distributed over the entire light-incident surface.

In the projector 1000 in association with the first exemplary embodiment, what is used as each first small lens 132a of the first lens array 130a in the normal mode lens integrator 120a is a lens having as its two-dimensional shape "a rectangle with a ratio of its lengthwise size to the crosswise size=9:16." Further, what is used as each first small lens 132b of the first lens array 130b in the persistence-of-vision-relaxed mode lens integrator 120b is a lens having as its two-dimensional shape "a rectangle with a ratio of its lengthwise size to the crosswise size=9:32."

Figure 3A:
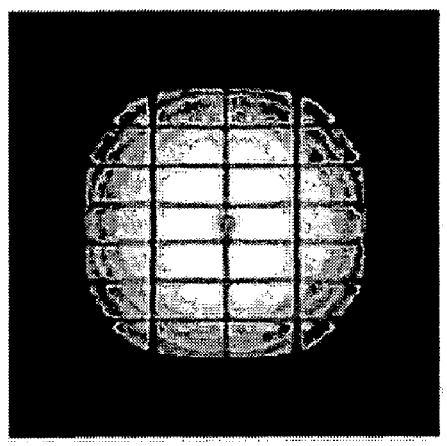
FIGS. 3A–3E are views of an in-plane light intensity distribution that an illuminating light beam has when a normal mode is selected in the first exemplary embodiment.
Figure 3B:
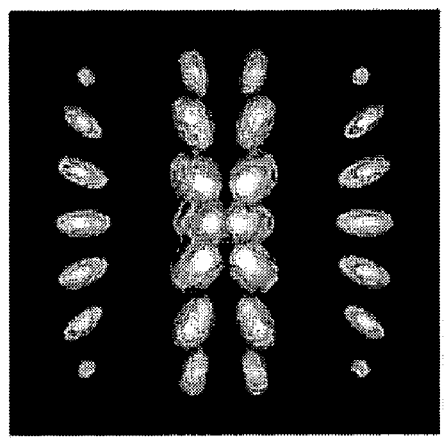
Figure 3C:
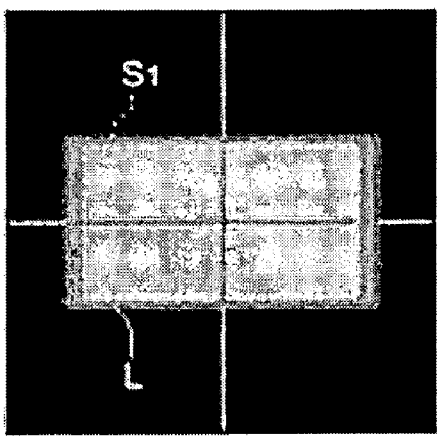
Figure 3D:
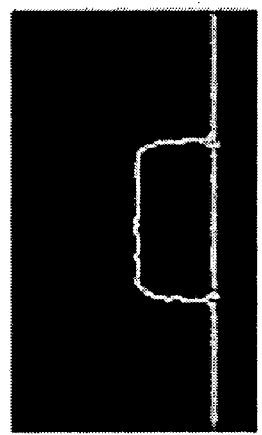
Figure 3E:
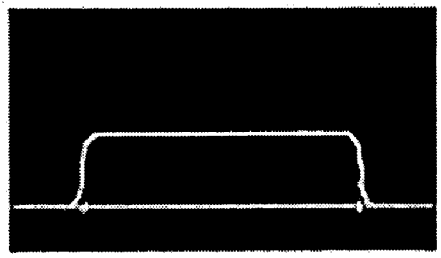

FIGS. 3A–3E illustrate the in-plane light intensity distribution that an illuminating light beam has when the normal mode is selected. FIG. 3A is a view showing an in-plane light intensity distribution on the first lens array 130a. FIG. 3B is a view showing an in-plane light intensity distribution on the second lens array 140a. FIG. 3C is a view showing an in-plane light intensity distribution in an optically conjugate plane with respect to the image-forming region of the liquid crystal device. FIGS. 3D and 3E are views showing the in-plane light intensity distribution in graph form.

Figure 4A:
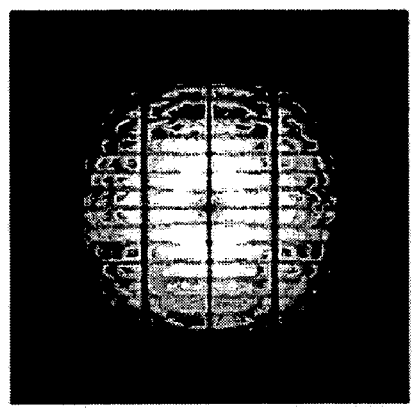
FIGS. 4A–4E are views of an in-plane light intensity distribution that an illuminating light beam has when the persistence-of-vision-relaxed mode is selected in the first exemplary embodiment.
Figure 4B:
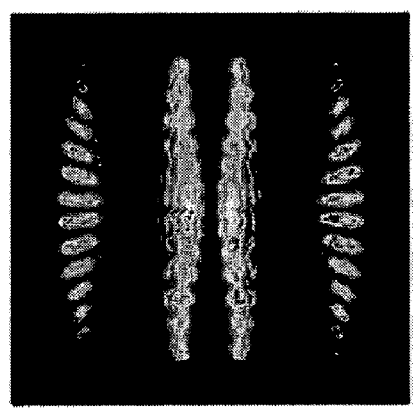
Figure 4C:
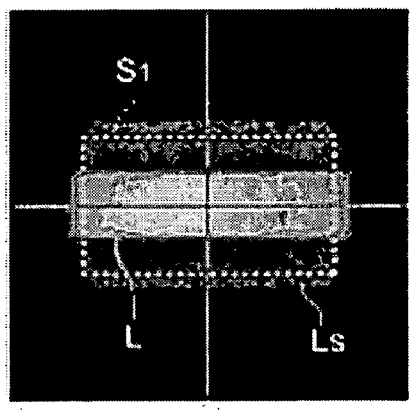
Figure 4D:
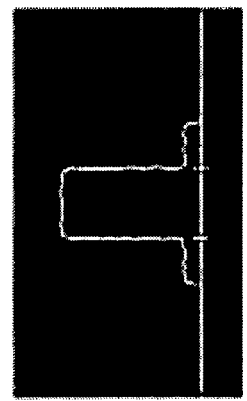
Figure 4E:
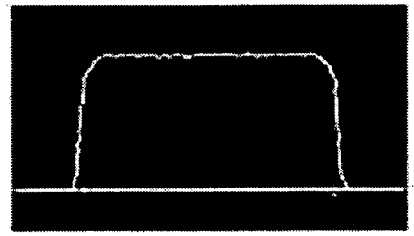

FIGS. 4A–4E illustrate the in-plane light intensity distribution that an illuminating light beam has when the persistence-of-vision-relaxed mode is selected. FIG. 4A is a view showing an in-plane light intensity distribution on the first lens array 130b. FIG. 4B is a view showing an in-plane light intensity distribution on the second lens array 140b. FIG. 4C is a view showing an in-plane light intensity distribution in an optically conjugate plane with respect to the image-forming region of the liquid crystal device. FIGS. 4D and 4E are views showing the in-plane light intensity distribution in graph form.

In FIGS. 3A–3E and 4A–4E, L shows the illuminating light beam; Ls shows stray light; and $S_1$ shows an area in a conjugate place of the liquid crystal device corresponding to the image-forming region thereof.

As described above, in the projector 1000 in association with the first exemplary embodiment, when the normal mode is selected, the illuminating light beam makes, as shown by FIG. 3C, an illuminating light beam has a two-dimensional shape similar to the image-forming region, such that the entire image-forming region is illuminated in any of lengthwise and crosswise directions (X-axis and Y-axis directions) of the image-forming region of the liquid crystal device under the effect of the normal mode lens integrator 120a, as in the case of a typical projector.

On the other hand, when the persistence-of-vision-relaxed mode is selected, under the effect of the persistence-of-vision-relaxed mode lens integrator 120b, the illuminating light beam is shaped into an illuminating light beam that entirely illuminates the image-forming region of the liquid crystal devices in one of the lengthwise and crosswise directions of the image-forming region (X-axis direction) and partially illuminates the image-forming region in the other direction (Y-axis direction) as shown by FIG. 4C. Therefore the illuminating light beam has a two-dimensional shape shortened in the other direction of the image-forming region (Y-axis direction).

Figure 5A:
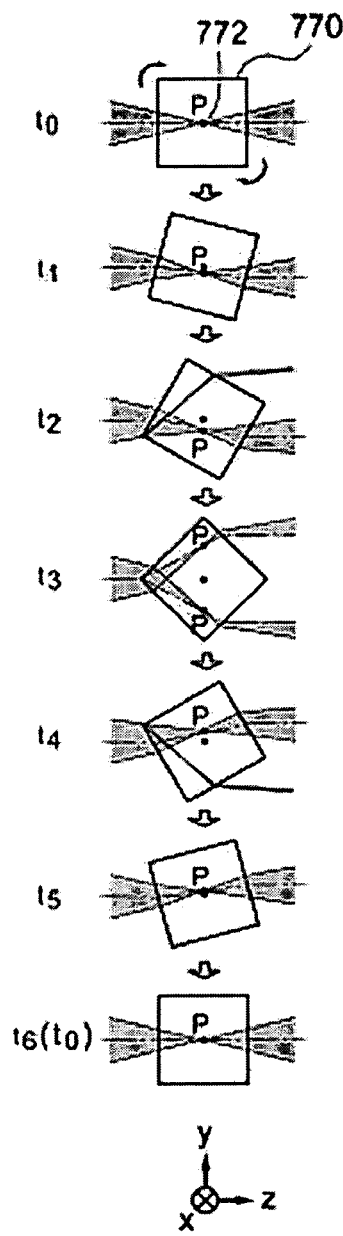
FIGS. 5A–5C are views of the relation between the rotation of the rotating prism and an illuminated state on the image-forming region of the liquid crystal device in the first exemplary embodiment.
Figure 5B:
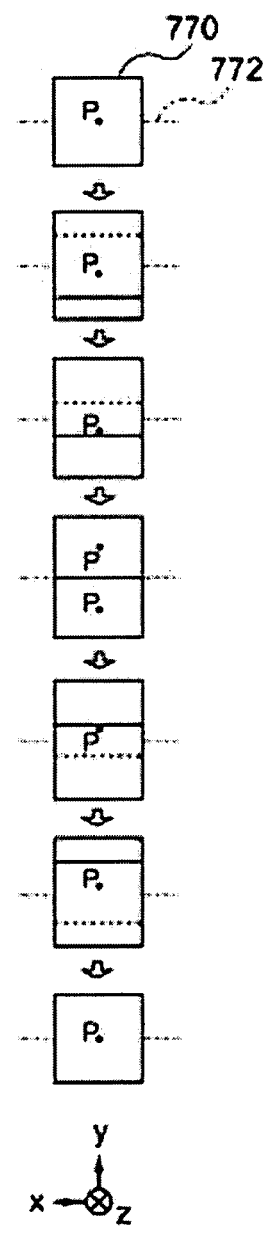
Figure 5C:
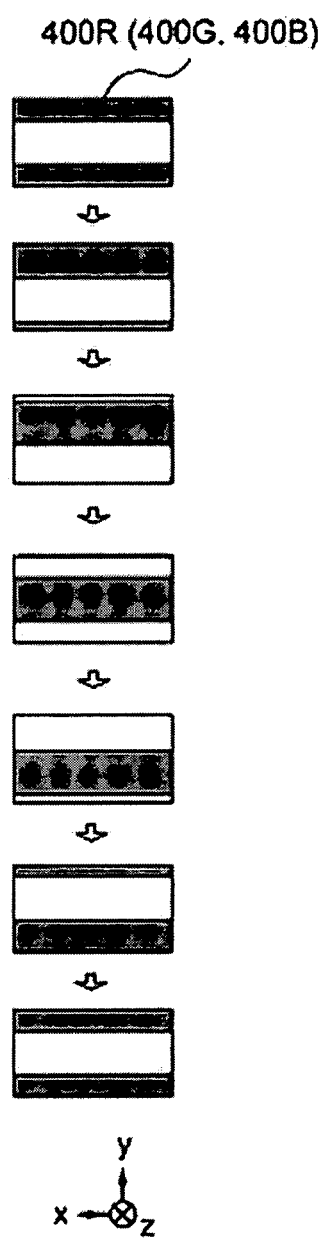

FIGS. 5A–5C are views showing relations between the rotation of the rotating prism 770 and an illuminated state on the image-forming region of each of the liquid crystal devices 400R, 400G, 400B. Of the drawings, FIG. 5A is a sectional view of the rotating prism 770 when it is viewed from a direction along the rotation axis 722 of the rotating prism. FIG. 5B is a view of the rotating prism 770 when it is viewed from a direction along the illuminating-optical axis. FIG. 5C is a view showing an irradiation state of the illuminating light beam on the image-forming region of each of the liquid crystal devices 400R, 400G, 400B.

As shown in FIGS. 5A and 5B, how a virtual center point image P of the first lens array 130b on the illuminating-optical axis 100ax is scrolled in up and down directions, with respect to the rotation axis 722 of the rotating prism 770 as the rotating prism 770 is rotated, is shown. As a result, as shown in FIG. 5C, when the rotating prism 770 is rotated, light-illuminated and light-unilluminated areas are scrolled alternately in turn in the image-forming region of each of the liquid crystal devices 400R, 400G, 400B.

When the mode-selecting device selects the normal mode, the rotating prism 770 is stopped in position so that an illuminating light beam illuminates the entire image-forming regions of the liquid crystal devices 400R, 400G, 400B. At this time, in the position where the rotating prism 770 is stopped, the light-incident surface is perpendicular to the illuminating-optical axis 100ax. Therefore, according to the projector 1000 in association with the first exemplary embodiment, when the mode-selecting device selects the normal mode, the rotating prism 770 is stopped in position so that an illuminating light beam illuminates the entire image-forming regions of the liquid crystal devices 400R, 400G, 400B and as such, the efficiency of use of light is made higher and the level of stray light is made lower.

In the projector 1000 in association with the first exemplary embodiment, on the light-transmissive surface of the rotating prism 770 is formed a antireflection film. This raises the light transmissivity of the rotating prism 770. Thus, the decrease of the efficiency of use of light can be minimized and the level of stray light can be lowered, whereby the contrast can be improved.

In the projector 1000 in association with the first exemplary embodiment, the light source 110 has an auxiliary mirror 116 that reflects light emitted by the arc tube 112 on the side nearer to the illuminated region toward the reflector 114.

This can make smaller the angular range of an illuminating light beam incident on the first small lenses 132a, 132b of the first lens arrays 130a, 130b and as such, secondary light beams output from the first small lenses 132a, 132b are well accepted by the second small lenses 142a, 142b of the corresponding second lens arrays 140a, 140b. Thus the efficiency of use of light is enhanced or increased. In this case, the first small lenses 132b and second small lenses 142b are smaller when the mode-selecting device selects the persistence-of-vision-relaxed mode, and as such, the effect becomes especially larger.

In addition, the auxiliary mirror 116 reflects light radiated by the arc tube 112 on the side nearer to the illuminated region toward the ellipsoidal reflector 114 and as such, it becomes unnecessary to set the size of the ellipsoidal reflector 114 so as to entirely cover the side of the arc tube 112 nearer to the illuminated region extending to the edge of the arc tube. Hence, there is an advantage in the ellipsoidal reflector 114 can be downsized, whereby the illumination device 100 can consequently be made smaller.

Moreover, since the convergent angle of a beam that converges from the ellipsoidal reflector 114 toward the second focal point of the ellipsoidal reflector 114, and the beam spot diameter thereof can be reduced by providing the auxiliary mirror 116, there is another advantage in that the optical components in the stages behind it can be made smaller, which enables further downsizing of the illumination device 100.

Further, the projector 1000 in association with the first exemplary embodiment includes, as shown in FIG. 1A: a color separation-and-light guide system 200 that separates an illuminating light beam emitted from the illumination device 100 into color lights; as liquid crystal devices, liquid crystal devices 400R, 400G, 400B that modulate color lights output from the color separation-and-light guide system 200 according to pieces of image information corresponding to the respective color lights; and a cross dichroic prism 500 that combines the color lights after the modulations by the liquid crystal devices 400R, 400G, 400B, wherein the color separation-and-light guide system 200 is located between the illumination device 100 and the liquid crystal devices 400R, 400G, 400B.

This allows the projector, whose efficiency of use of light is not reduced significantly to be made a 3-panel LCD full color projector superior in image quality even when the projector is arranged so as to attain smooth and good-quality moving-picture display.

The projector 1000 in association with the first exemplary embodiment has further a polarizer element 150 that aligns illuminating light beams from the light source 110 into a kind of linearly polarized lights and lets out the resultant lights.

The polarizer element 150 has a polarizing separation layer, which allows one linearly polarized component of the polarization components included in an illuminating light beam from the light source 110 to penetrate through the polarizing separation layer, and reflects the other linearly polarized component in a direction perpendicular to the illuminating-optical axis 100ax. The polarizer element 150 further has a reflection layer that reflects the other linearly polarized component reflected by the polarizing separation layer in a direction in parallel with the illuminating-optical axis 100ax, and a phase plate that converts the other linearly polarized component reflected by the reflection layer into a linearly polarized component identical with the one linearly polarized component.

Thus, it becomes possible to convert an illuminating light beam from the light source 110 into one kind of linearly polarized light having one polarization axis under the effect of the polarizer element 150. Therefore, an illuminating light beam from the light source 110 can be used effectively in the case where an electro-optic modulator of a type such that one kind of linearly polarized light is utilized, such as a liquid crystal device, is used as an electro-optic modulator as in the projector 1000 in association with the first embodiment.

[Second Exemplary Embodiment]

FIGS. 6A–6D illustrate a projector 1002 in association with the second exemplary embodiment. FIG. 6A is a top view of an optical system of the projector 1002 in a normal mode. FIG. 6B is a top view of the optical system of the projector 1002 in a persistence-of-vision-relaxed mode. FIG. 6C is a side view of the optical system of the projector 1002 in the normal mode. FIG. 6D is a side view of the optical system of the projector 1002 in the persistence-of-vision-relaxed mode. Now, it is noted that in FIG. 6B the sketch of parts of the optical system behind the rotating prism 770 are omitted because the parts are the same as those shown in FIG. 6A.

Figure 7A:
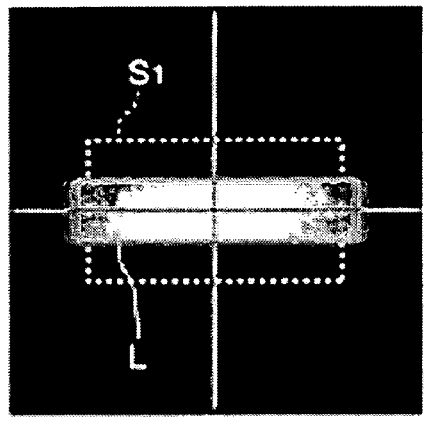
FIGS. 7A–7C are views of an in-plane light intensity distribution that an illuminating light beam has when a persistence-of-vision-relaxed mode is selected in the second exemplary embodiment.
Figure 7B:
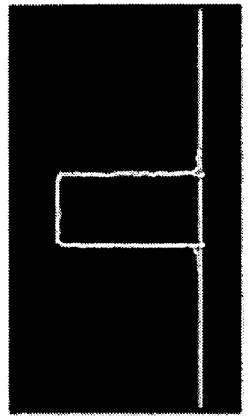
Figure 7C:
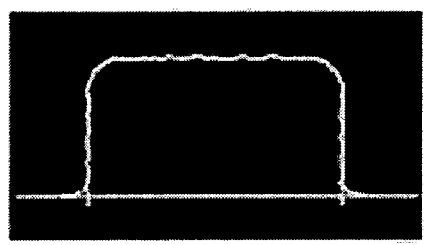

FIGS. 7A–7C illustrate the in-plane light intensity distribution that an illuminating light beam has when the persistence-of-vision-relaxed mode is selected in the projector 1002 in association with the second exemplary embodiment. FIG. 7A is a view showing an in-plane light intensity distribution in an optically conjugate plane with respect to the image-forming region of each of the liquid crystal devices 400R, 400G, 400B. FIGS. 7B and 7C are views showing the in-plane light intensity distribution in graph form.

Figure 8A:
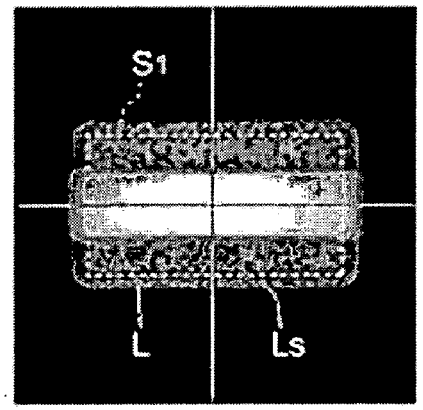
FIGS. 8A–8C are views of the in-plane light intensity distribution that an illuminating light beam has when the normal mode is selected in the second exemplary embodiment.
Figure 8B:
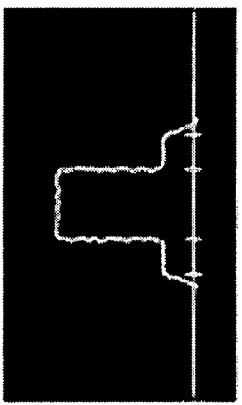
Figure 8C:
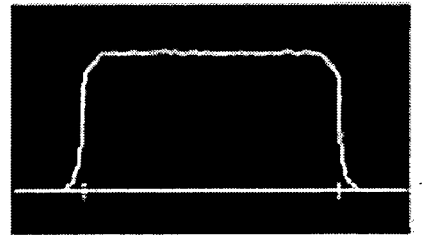

FIGS. 8A–8C illustrate the in-plane light intensity distribution that an illuminating light beam has when the persistence-of-vision-relaxed mode is selected in a projector in association with a comparative example to the second exemplary embodiment. FIG. 8A is a view showing an in-plane light intensity distribution on the image-forming region of the liquid crystal device. FIGS. 8B and 8C are views showing the in-plane light intensity distribution in graph form.

In FIGS. 7A–7C and 8A–8C, L shows the illuminating light beam; Ls shows stray light; and $S_1$ shows an area in a conjugate place of the liquid crystal device corresponding to the image-forming region thereof.

As shown by FIGS. 6B and 6D, the projector 1002, in association with the second exemplary embodiment, further includes a light-shielding device 170 that is inserted in a substantially optically conjugate place with respect to the liquid crystal devices 400R, 400G, 400B, between the illumination device 100 and the rotating prism 770, when the mode-selecting device selects the persistence-of-vision-relaxed mode.

As described above, if the arc tube 112 in the light source 110 has a relatively longer arc length (1.3 mm or longer), an illuminating light beam emitted from the illumination device 100 does not make an ideal illuminating light beam that has a two-dimensional shape shortened in the other direction (Y-axis direction) in the optically conjugate place with respect to the liquid crystal devices 400R, 400G, 400B as shown in FIG. 8A, but an illuminating light beam by which a portion surrounding the plane covered by the two-dimensional shape is also slightly irradiated with light in fact. Therefore, even if the projector works in the persistence-of-vision-relaxed mode, using an illuminating light beam like this weakens the effect of relaxing the persistence of vision, which makes it difficult or impossible to obtain a clear image.

In contrast, according to the projector 1002 in association with the second exemplary embodiment, when the mode-selecting device selects the persistence-of-vision-relaxed mode, the light-shielding device 170 is inserted in a substantially optically conjugate place with respect to the liquid crystal devices 400R, 400G, 400B between the illumination device 100 and the liquid crystal devices 400R, 400G, 400B. As such, it becomes possible to block the light that has leaked out to the surrounding portion as described above. Therefore, in the image-forming regions of the liquid crystal devices 400R, 400G, 400B, an illuminating light beam has an in-plane light intensity distribution having a two-dimensional shape shortened in the other direction (Y-axis direction) similar to that of an ideal illuminating light beam, as shown in FIG. 7A. On this account, according to the projector 1002 in association with the second exemplary embodiment, even when an arc tube with a relatively longer arc length (1.3 mm or longer) is used, the effect of relaxing the persistence of vision is not weakened.

Except for this difference, the projector 1002 in association with the second exemplary embodiment has the same configuration as that of the projector 1000 in association with the first exemplary embodiment and as such, it has the same advantages as that of the projector 1000 in association with the first exemplary embodiment.

[Third Exemplary Embodiment]

Figure 9A:
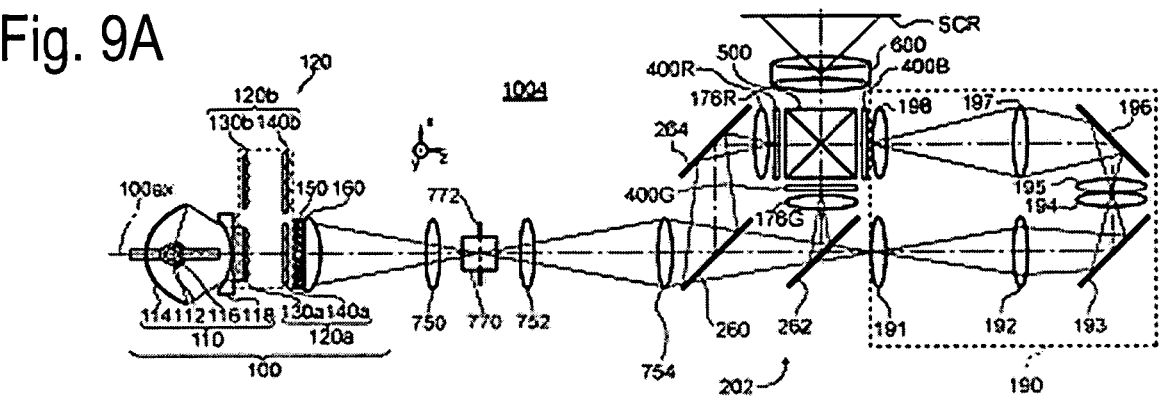
FIGS. 9A–9D are views of a projector in association with a third exemplary embodiment.
Figure 9B:
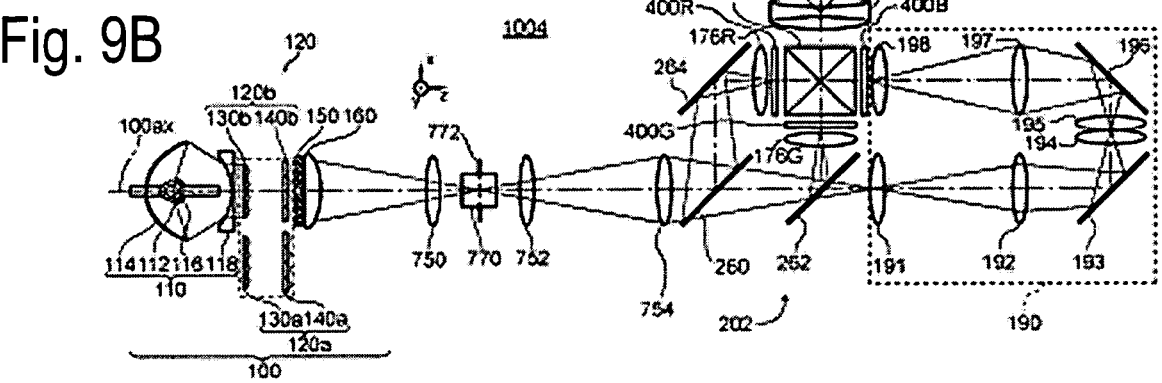
Figure 9C:
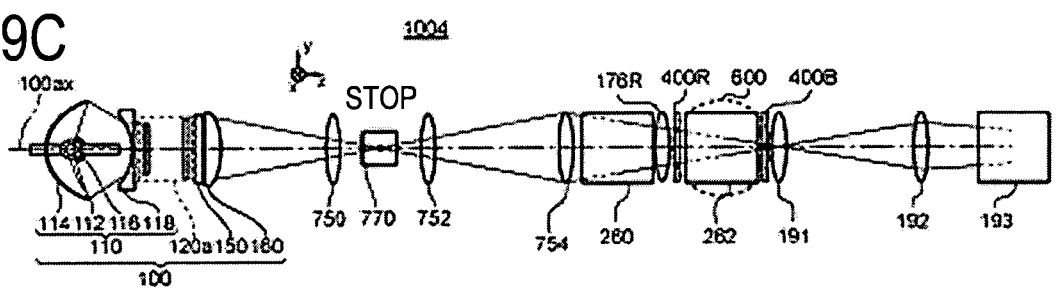
Figure 9D:
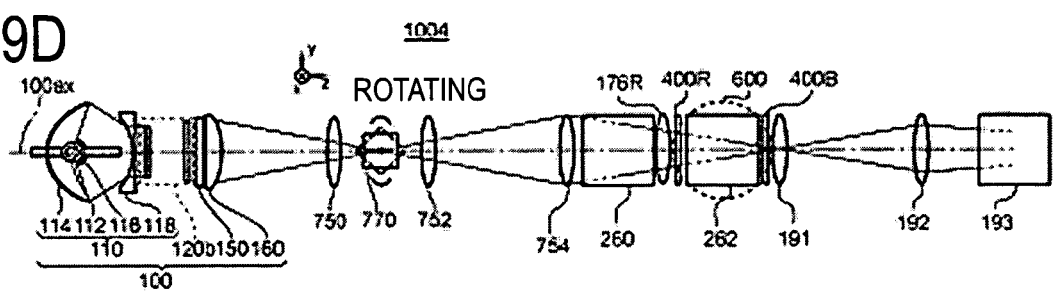
Figure 10A:
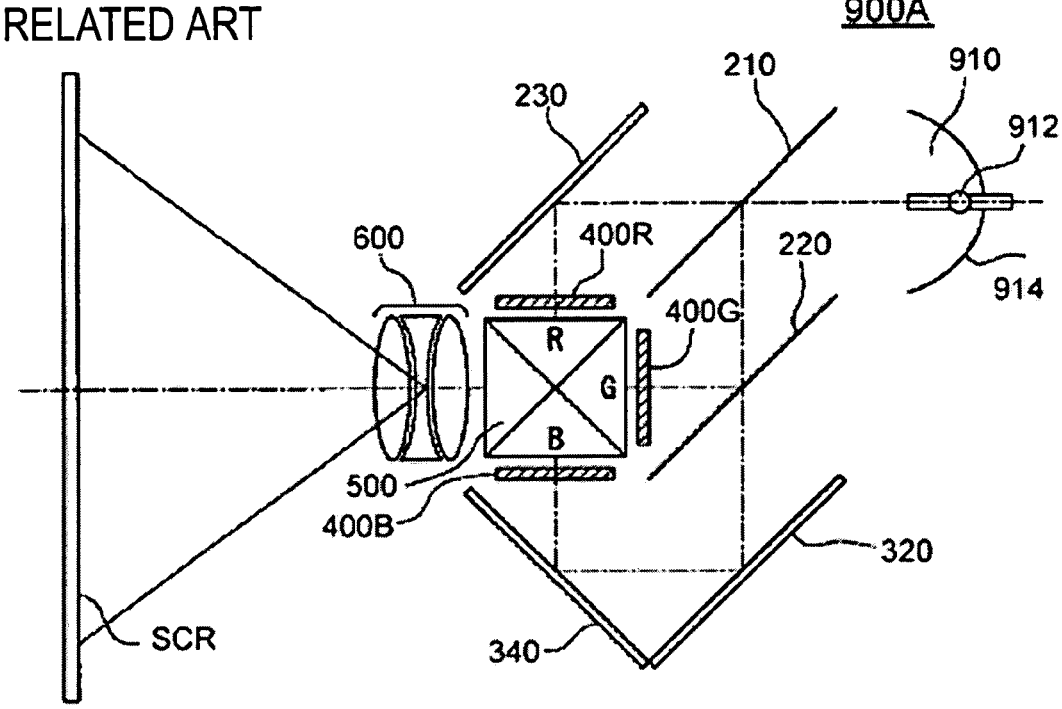
FIGS. 10A–10C are views of a related art projector.
Figure 10B:
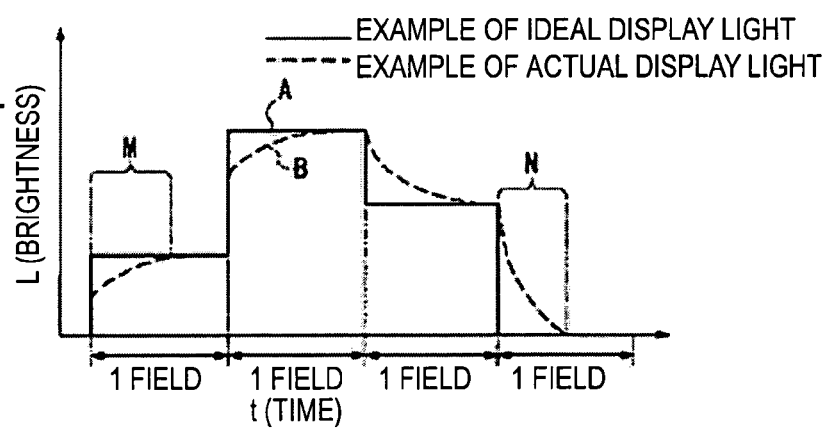
Figure 10C:
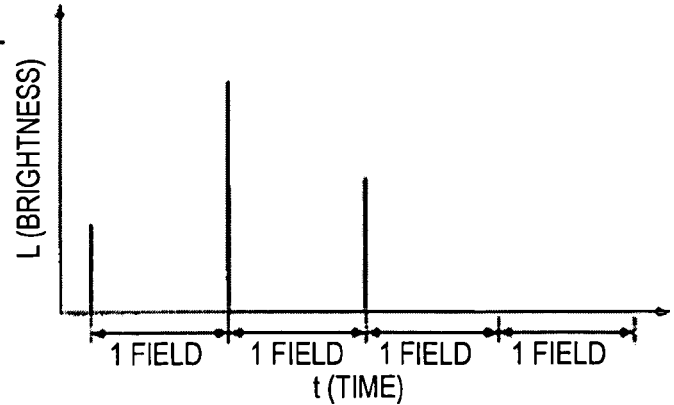
Figure 11A:
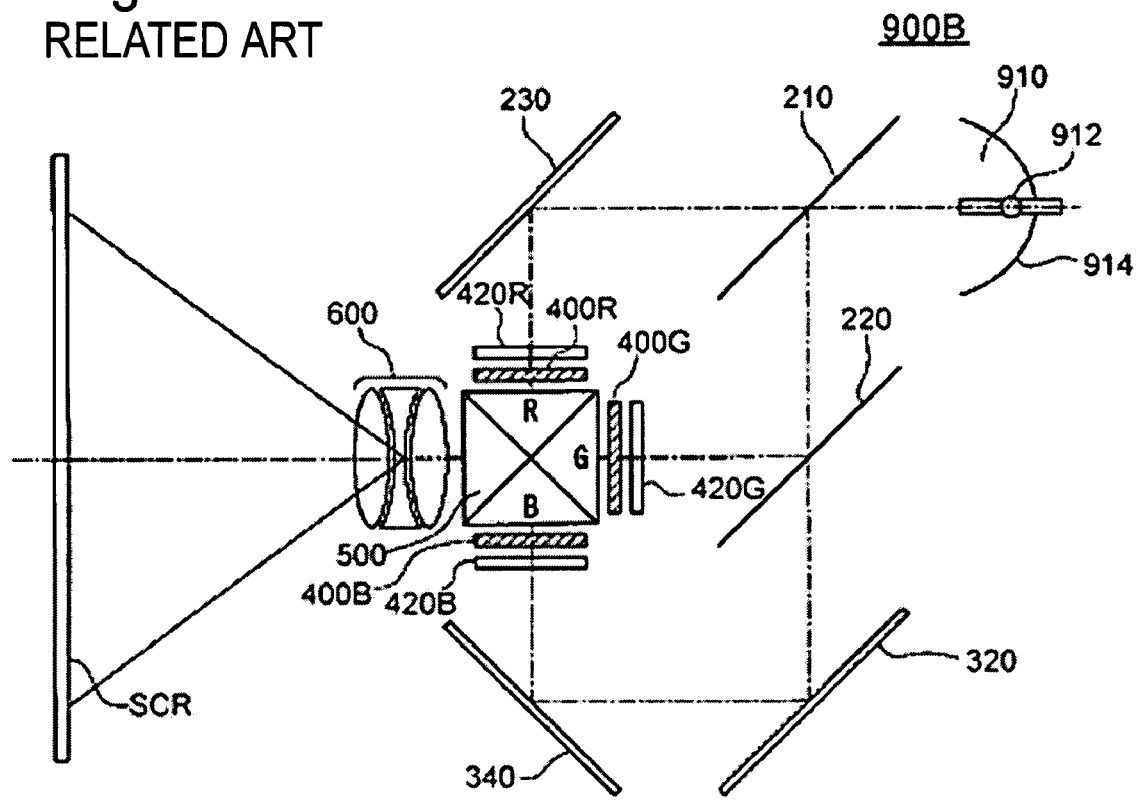
FIGS. 11A–11C are views of another related art projector.
Figure 11B:
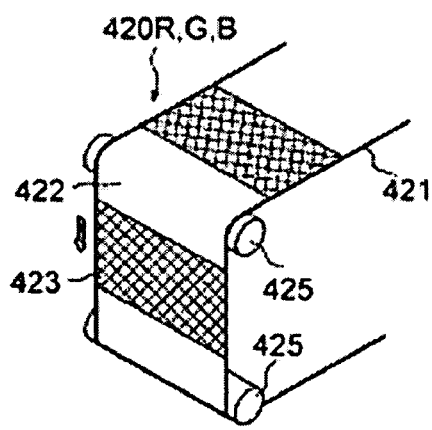
Figure 11C:
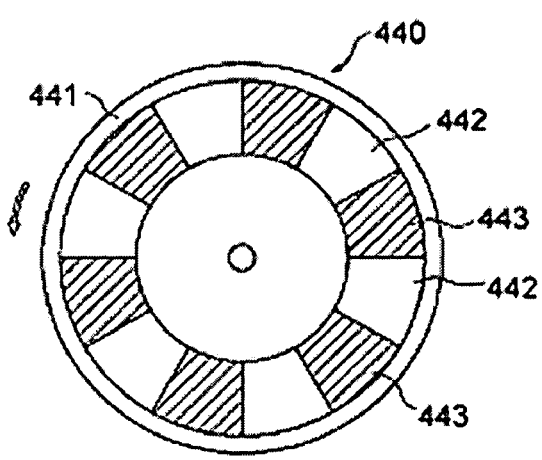

FIGS. 9A–9D illustrate a projector 1004 in association with the third exemplary embodiment. FIG. 9A is a top view of an optical system of the projector 1004 in a normal mode. FIG. 9B is a top view of the optical system of the projector 1004 in a persistence-of-vision-relaxed mode. FIG. 9C is a side view of the optical system of the projector 1004 in the normal mode. FIG. 9D is a side view of the optical system of the projector 1004 in the persistence-of-vision-relaxed mode.

The projector 1004, in association with the third exemplary embodiment, differs from the projectors 1000 and 1002 respectively associated with the first and second exemplary embodiments, in that the configuration of the color separation-and-light guide system 202 is different. More specifically, the projector 1004 of the third exemplary embodiment has a color separation-and-light guide system 202 having a double relay system 190 instead of the equi-optical path system. The double relay system 190 is used as the color separation-and-light guide system in order to make identical all the directions in which the light-illuminated and light-unilluminated areas are scrolled on the liquid crystal devices 400R, 400G, 400B.

As described above, the projector 1004 in association with the third exemplary embodiment differs from the projectors 1000 and 1002 respectively associated with the first and second exemplary embodiments in the configuration of the color separation-and-light guide system 202. However, as in the projectors 1000 and 1002 respectively associated with the first and second exemplary embodiments, when the mode-selecting device selects the persistence-of-vision-relaxed mode, the persistence-of-vision-relaxed mode lens integrator 120b is inserted in the optical path of an illuminating light beam and the rotating prism 770 performs a predetermined action. Thus, according to the projector 1004 in association with the third exemplary embodiment, the illuminating light beam is shaped so as to entirely illuminate the image-forming regions of the liquid crystal devices 400R, 400G, 400B in one of the lengthwise and crosswise directions of the image-forming regions (X-axis direction), and partially illuminate the image-forming regions in the other direction (Y-axis direction). The illuminating light beam also has a sectional shape shortened in the other direction (Y-axis direction). The illuminating light beam can be made to scan the image-forming regions of the liquid crystal devices along the other direction (Y-axis direction) in synchronization with the frame rate of the liquid crystal devices 400R, 400G, 400B. Hence, in the image-forming regions of the liquid crystal devices 400R, 400G, 400B, light-illuminated and light-unilluminated areas are scrolled alternately in turn. Thus, a projector in which the persistence of vision is relaxed and by which smooth and good-quality moving-picture display can be achieved is made.

Also, according to the projector 1004 in association with the third exemplary embodiment, an illuminating light beam having a sectional shape shortened in the other direction (Y-axis direction), as described above, is attained by using, as a lens integrator, the persistence-of-vision-relaxed mode lens integrator 120b having the first lens array 130b with the first small lenses 132b shortened in the other direction (Y-axis direction) in a two-dimensional shape. Therefore, in contrast with the case of using an optical shutter, an illuminating light beam emitted from the light source 110 can be guided to the image-forming regions of the liquid crystal devices 400R, 400G, 400B without wasting the illuminating light beam, and thus significant reduction in use of light efficiency is avoided.

Therefore, even when the arrangement that enables smooth and good-quality moving-picture display is made, the projector 1004 in association with the third exemplary embodiment can make a projector whose use of light efficiency is not reduced significantly as in the cases of the projectors 1000 and 1002 respectively associated with the first and second exemplary embodiments.

Also, the projector 1004 in association with the third exemplary embodiment may further include a light-shielding device that is inserted in a substantially optically conjugate place with respect to the liquid crystal devices 400R, 400G, 400B between the illumination device 100 and the rotating prism 770, when the mode-selecting device selects the persistence-of-vision-relaxed mode, as in the case of the projector 1002 in association with the second exemplary embodiment. In that case, even when an arc tube with a relatively longer arc length (1.3 mm or longer), the effect of relaxing the persistence of vision is not weakened as in the case of the projector 1002 in association with the second exemplary embodiment.

While the projectors in association with the exemplary embodiments of the invention have been described above, the exemplary embodiments are not limited and can be practiced in various forms within a scope not departing from the subject matter thereof. For example, the following modifications can be made.

(1) While the projectors 1000–1004 of the above described exemplary embodiments are each a transmission-type projector with a transmission-type electro-optic modulator, the exemplary embodiments are not so limited. The exemplary embodiments can be applied to a reflection-type projector with a reflection-type electro-optic modulator.

(2) In the projectors 1000–1004 of the above described exemplary embodiments, a liquid crystal device is used as the electro-optic modulator. However, the exemplary embodiments are not so limited. The electro-optic modulator may be a device capable of modulating an incident light according to image information in general, and therefore a modulator of micromirror type, or the like, may be utilized. For example, DMD (Digital Micromirror Device) may be used as the modulator of micromirror type.

(3) In the projectors 1000–1004 of the above embodiments, a scanning system is used as the rotating prism 770. However, the exemplary embodiments are not so limited. For example, a galvanometer mirror, polygon mirror, and DMD (Digital Micromirror Device) may be used as such scanning system preferably.

(4) In the projectors 1000–1004 of the above embodiments, a light source having an ellipsoidal reflector 114, an arc tube 112 having its center of light emission in the vicinity of the first focal point of the ellipsoidal reflector 114, and a collimator lens 118 are used as the light source 110. However, the exemplary embodiments are not so limited. A light source having a parabolic reflector and an arc tube having its center of light emission in the vicinity of the focal point of the parabolic reflector may preferably be used as such light source.

(5) While in the above exemplary embodiments, the description has been presented showing a projector with three liquid crystal devices 400R, 400G, 400B, the exemplary embodiments are not so limited. The exemplary embodiments can be applied to a projector with one, two, or more than three liquid crystal devices, as well.

(6) The exemplary embodiments can be applied to a front projection type projector by which a projected image is projected from the side where it is observed, as well as a rear projection type projector by which a projected image is projected from the side opposite from the side where it is observed.

What is claimed is:

1. A projector, comprising:
   an illumination device including
   a light source having sides, one of the sides being nearer to an illuminated region than another of the sides, the light source emitting a substantially parallel illuminating light beam on the one side that is nearer to the illuminated region,
   lens integrators, each of the lens integrators having a first lens array with a plurality of first small lenses to split the illuminating light beam emitted from the light source into a plurality of secondary light beams, and a second lens array with a plurality of second small lenses corresponding to the plurality of first small lenses of the first lens array, and
   a superimposing lens that superimposes the secondary light beams output from the lens integrator in the illuminated region;
   an electro-optic modulating device that modulates the illuminating light beam emitted from the illumination device according to image information;
   a projection optical system that projects the illuminating light beam modulated by the electro-optic modulating device;
   a mode-selecting device that selects a mode of the projector, including a normal mode in which an image-forming region of the electro-optic modulating device is entirely illuminated in any of lengthwise and crosswise directions of the image-forming region, and a persistence-of-vision-relaxed mode in which the image-forming region of the electro-optic modulating device is entirely illuminated in one of the lengthwise and crosswise directions of the image-forming region and partially illuminated in the other direction; and
   a scanning system that makes the illuminating light beam scan the image-forming region of the electro-optic modulating device along the other direction in synchronization with a frame rate of the electro-optic modulating device when the mode-selecting device selects the persistence-of-vision-relaxed mode;

the illumination device having, as the lens integrators, a normal mode lens integrator that is inserted in an optical path of the illuminating light beam when the mode-selecting device selects the normal mode, and a persistence-of-vision-relaxed mode lens integrator that is inserted in the optical path of the illuminating light beam when the mode-selecting device selects the persistence-of-vision-relaxed mode;

the first small lenses in the first lens array in the normal mode lens integrator having a two-dimensional shape similar to the image-forming region of the electro-optic modulating device so as to shape the illuminating light beam emitted from the illumination device into an illuminating light beam having a sectional shape that entirely illuminates the image-forming region of the electro-optic modulating device in any of the lengthwise and crosswise directions of the image-forming region; and the first small lenses in the first lens array in the persistence-of-vision-relaxed mode lens integrator having a two-dimensional shape shortened in the other direction so as to shape the illuminating light beam emitted from the illumination device into an illuminating light beam having a sectional shape that entirely illuminates the image-forming region of the electro-optic modulating device in the one direction of the image-forming region and partially illuminates the image-forming region in the other direction.

2. The projector of claim 1, a length of each first small lens in the persistence-of-vision-relaxed mode lens integrator along the one direction being identical with a length of each first small lens in the normal mode lens integrator along the one direction, and a length of each first small lens in the persistence-of-vision-relaxed mode lens integrator along the other direction being shorter than a length of each first small lens in the normal mode lens integrator along the other direction.

3. The projector of claim 2, a number of lines of the first small lenses in the persistence-of-vision-relaxed mode lens integrator along the one direction being identical with a number of lines of the first small lenses in the normal mode lens integrator along the one direction, and a number of lines of the first small lenses in the persistence-of-vision-relaxed mode lens integrator along the other direction being larger than a number of lines of the first small lenses in the normal mode lens integrator along the other direction.

4. The projector of claim 3, an outer size of the first lens array in the persistence-of-vision-relaxed mode lens integrator being identical with an outer size of the first lens array in the normal mode lens integrator.

5. The projector of claim 1, a focal length of each first small lens in the persistence-of-vision-relaxed mode lens integrator being identical with a focal length of each first small lens in the normal mode lens integrator.

6. The projector of claim 1, the scanning system being stopped in place so that the illuminating light beam illuminates the entire image-forming region of the electro-optic modulating device when the mode-selecting device selects the normal mode.

7. The projector of claim 1, the light source having:

an arc tube;

an ellipsoidal reflector that reflects light from the arc tube;

an auxiliary mirror that reflects light emitted by the arc tube on a side nearer to the illuminated region toward the reflector; and a collimator lens that makes light reflected by the ellipsoidal reflector a substantially parallel light.

8. The projector of claim 1, the scanning system including a rotating prism disposed between the illumination device and electro-optic modulating device, the rotating prism having a rotation axis perpendicular to an illuminating-optical axis, the rotation axis being disposed in a substantially optically conjugate place with respect to the electro-optic modulating device, and the rotating prism being arranged so that its rotation causes light-illuminated and light-unilluminated areas to be scrolled in turn on the electro-optic modulating device in synchronization with the frame rate of the electro-optic modulating device.

9. The projector of claim 1, further comprising:

a light-shielding device that is inserted in a substantially optically conjugate place with respect to the electro-optic modulating device between the illumination device and scanning system when the mode-selecting device selects the persistence-of-vision-relaxed mode.

10. The projector of claim 9, the scanning system including a rotating prism having a rotation axis perpendicular to an illuminating-optical axis, and the rotating prism being arranged so that its rotation causes light-illuminated and light-unilluminated areas to be scrolled in turn on the electro-optic modulating device in synchronization with the frame rate of the electro-optic modulating device.

11. The projector of claim 1, further comprising:

a color separation-and-light guide system between the illumination device and electro-optic modulating device, the color separation-and-light guide system separating the illuminating light beam emitted from the illumination device into a plurality of color lights;

a plurality of electro-optic modulators that constitute the electro-optic modulating device and each modulate corresponding one of the color lights output from the color separation-and-light guide system according to image information corresponding to the one color light; and a cross dichroic prism that combines the color lights modulated by the plurality of electro-optic modulators.

12. The projector of claim 1, further comprising:

a polarizer element that aligns the illuminating light beam from the light source into linearly polarized light and outputs the resultant light.

* * * * *